United States Patent [19]

Sakamoto

[11] Patent Number: 5,038,387
[45] Date of Patent: Aug. 6, 1991

[54] METHOD OF ENHANCING BORDER OF REGION INCLUDED IN IMAGE

[75] Inventor: Takashi Sakamoto, Kyoto, Japan

[73] Assignee: Dainippon Screen Mfg. Co., Ltd., Kyoto, Japan

[21] Appl. No.: 379,770

[22] Filed: Jul. 14, 1989

[30] Foreign Application Priority Data

Jul. 29, 1988 [JP] Japan .................. 63-191114

[51] Int. Cl.$^5$ .............. G06K 9/40; G06K 9/38; G06K 9/56; G06K 9/74
[52] U.S. Cl. ..................... 382/54; 362/52; 362/32; 362/27
[58] Field of Search ............ 382/50, 52, 54, 22, 382/32, 27; 358/448, 458

[56] References Cited

U.S. PATENT DOCUMENTS

| | | | |
|---|---|---|---|
| 4,317,179 | 2/1982 | Kato et al. | 382/54 |
| 4,672,463 | 6/1987 | Tomohisa et al. | 382/54 |
| 4,817,180 | 3/1989 | Cho et al. | 382/27 |
| 4,903,316 | 2/1990 | Hongo et al. | 382/50 |
| 4,941,190 | 7/1990 | Joyce | 382/54 |

Primary Examiner—Michael Razavi
Assistant Examiner—Michael R. Cammarata
Attorney, Agent, or Firm—Lowe, Price, Leblanc and Becker

[57] ABSTRACT

Preliminary sharp signals $S_0$, $S_{45}$, $S_{90}$ and $S_{135}$ are generated based on the shapes and directions of long regions $R_0$, $R_{45}$, $R_{90}$ and $R_{135}$ respectively. Then differences between the preliminary sharp signals $S_0$, $S_{34}$, $S_{90}$ and $S_{135}$ and an unsharp signal U are obtained and the difference which has the maximum absolute value is selected as a detailed original signal. A detailed signal is generated by multiplying the detailed original signal by a predetermined coefficient K. A sharp signal S added with the detailed signal and thereby an enhanced pixel data $S_N$ is generated.

18 Claims, 15 Drawing Sheets $R_0 \rightarrow S_0$, $R_{45} \rightarrow S_{45}$, $R_{90} \rightarrow S_{90}$, $R_{135} \rightarrow S_{135}$, $P \rightarrow S$, $R \rightarrow U$ $|Sa-Ua| > 0$ $|Sa-Ua| > |Sb-Ub|$

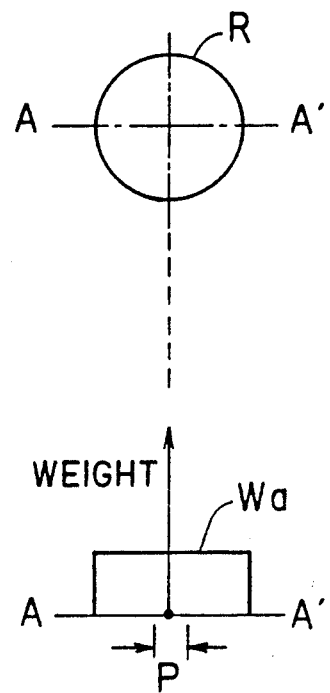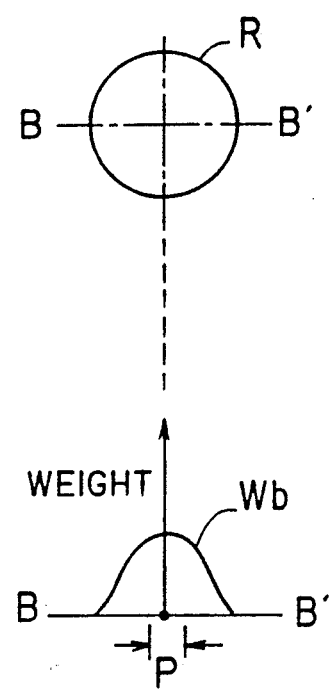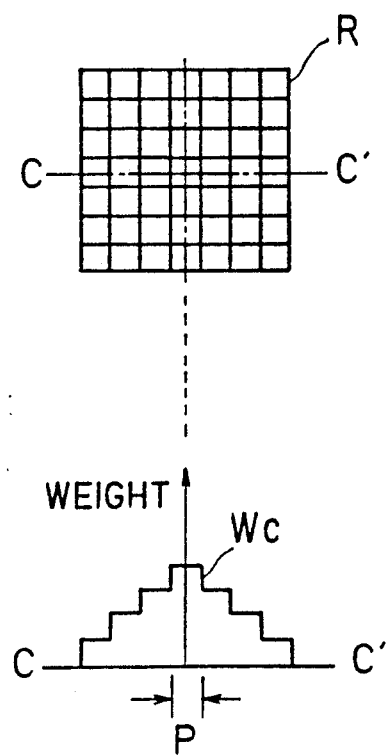

$R_0 \to S_0$, $R_{45} \to S_{45}$, $R_{90} \to S_{90}$, $R_{135} \to S_{135}$, $P \to S$, $R \to U$

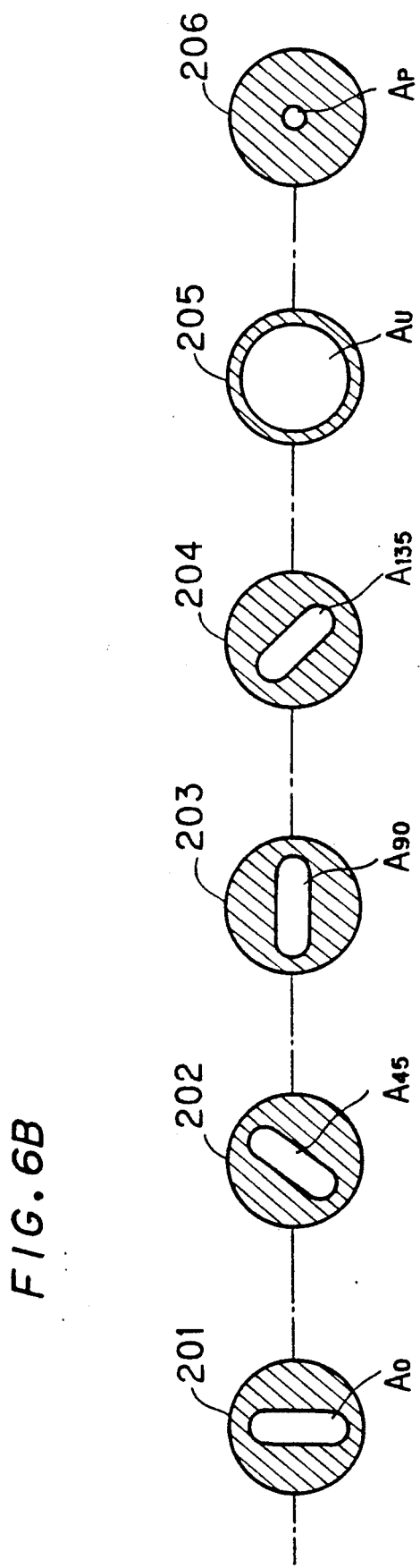

METHOD OF ENHANCING BORDER OF REGION INCLUDED IN IMAGE

BACKGROUND OF THE INVENTION

1. Field of the Invention

The present invention relates to a method of enhancing a border part included in an image of an original in an apparatus for scanning the image of the original and reading image data thereof, such as a process scanner (for a color or black-and-white image) or a facsimile.

2. Description of the Prior Art

As is well known in the art, various method have been proposed in order to enhance border parts included in images of originals read in a process scanner or the like.

According to the most basic method within these, a read signal (sharp signal) S from a pixel P (hereinafter referred to as "noted pixel"), which is a current object of reading, and an average read signal (unsharp signal) U from a region R around the noted pixel P are extracted first. Then the difference therebetween, i.e., a detailed original signal (S−U) is multiplied by a prescribed coefficient K, to regard the product as a detailed signal:

$$D_T = K(S - U) \quad (1)$$

Thereafter the sharp signal S is added with the detailed signal $D_T$ as follows:

$$\begin{aligned} D &= S + D_T \\ &= S + K(S - U) \end{aligned} \quad (2)$$

This signal D is regarded as pixel data of the noted pixel P, thereby to perform border enhancement.

In a more advanced method proposed for border enhancement, a system of extracting an unsharp signal U is devised. FIGS. 2B and 2C illustrate such examples, while FIG. 2A shows the aforementioned basic method, i.e., a general unsharp masking (USM) method for reference.

Referring to FIG. 2A, an unsharp signal U is obtained by simply averaging read signals from a neighbourhood region R with uniform weight distribution $W_a$. Referring to FIG. 2B showing the case of differential masking (DM), on the other hand, the weighted mean of read signals from a neighbourhood region R is obtained with weight distribution $W_b$ increased toward a noted pixel P and reduced toward peripheral parts, so that the same is regarded as an unsharp signal U. Referring to FIG. 2C, further, differential masking is digitally performed with digital weight distribution $W_c$. The matrix lattice in FIG. 2C shows pixel array in the digitalized image data, and the neighbourhood region R is in the form of a rectangle.

These prior art examples are described in Japanese Patent Laying-Open Gazette No. 141871/1984 and Japanese Patent Publication Gazettes Nos. 27067/1964 and 24581/1964 respectively.

In each of the aforementioned methods, however, density difference is inevitably enhanced in proportion to difference between the sharp signal S and the unsharp signal U, regardless of the cause for such difference. Thus, strong enhancement may be erroneously performed even if there is no need for enhancement or only slight enhancement is required in practice.

For example, an original itself may have a rough surface or turbulence such as a pinhole or dirt (hereinafter referred to as "spot defect of original") may occur on the original to cause concentration of density change in a narrow area. If black dirt $D_{st}$ of about one pixel size is adhered to a white region of an original as shown in FIG. 3A, for example, a sharp signal $S_a$ indicates a low level (high density) when a pixel P in the position of this dirt $D_{st}$ is noted by scan reading while an unsharp signal $U_a$ obtained by averaging read signals from a wide region R including the pixel P indicates a high level (low density). Thus, strong enhancement is inevitably performed although there is no need to enhance the image of this dirt $D_{st}$.

Further, such useless density difference enhancement may be performed at a degree higher than that of enhancement originally required in an image border part. For example, when a noted pixel P is close to a continuous borderline (visible outline) E shown in FIG. 3B, an unsharp signal $U_b$ is obtained as an average value of read signals of a high density region $R_S$ and a low density region $R_H$ which are adjacent to each other along the borderline E, and difference between the same and a sharp signal $S_b$ is not increased as the example of the dirt $D_{st}$ shown in FIG. 3A.

According to the conventional border enhancement method, as hereinabove described, not only density difference is enhanced in a spot defect part of an original but variable density difference of such defect part is inevitably enhanced at a stronger degree as compared with a continuous border part which must be enhanced.

SUMMARY OF THE INVENTION

The present invention is directed to a method of enhancing a border of an image region included in an original image.

According to the present invention, the method comprises the steps of (a) obtaining an object pixel data representing a density level of a designated object pixel on the original image, (b) obtaining a plurality of first image data representing respective density levels of a plurality of directional areas which are located at a neighborhood of the object pixel and are oriented in different directions on the original image, respectively, (c) obtaining a second image data representing a density level of a closed area which includes the plurality of directional areas and whose center is located at the object pixel, (d) obtaining absolute values of respective differences between the plurality of first image data and the second image data, (e) finding a maximum one of the absolute values, (f) combining the maximum one with the object pixel data to obtain a combined data, and (g) repeating the steps (a) through (f) while updating the designated object pixel to thereby obtain an image data as a set of respective combined data representing an image in which the border is enhanced in density levels.

Preferably the step (b) includes the step of (b-1) photoelectrically reading the original image through a plurality of directional appartures to obtain the plurality of first image data, respectively, where respective shapes and directions of the plurality of directional appratures are adapted for the plurality of said directional areas.

The term "density level" used in this specification implies not only a level of density signal usually applied in the field of printing but also a level of luminance signal.

Accordingly, an object of the present invention is to obtain a border enhancement method which can suppress the degree of density difference enhancement with respect to a spot defect part of an original while maintaining the function of border enhancement in a continuous border part.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 2A to 2C illustrate methods of forming unsharp signals;

DESCRIPTION OF THE PREFERRED EMBODIMENT

Figure 1:
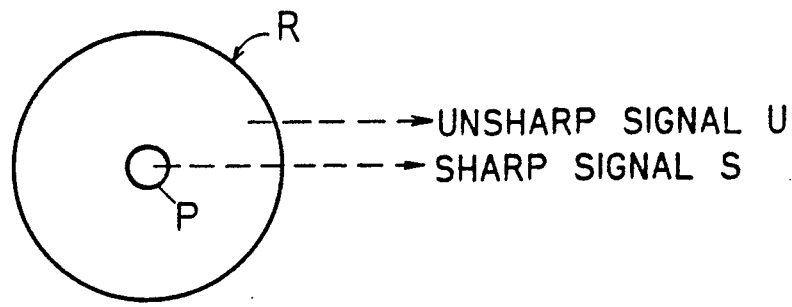
FIG. 1 illustrates regions corresponding to a sharp signal and an unsharp signal.
Figure 3A:
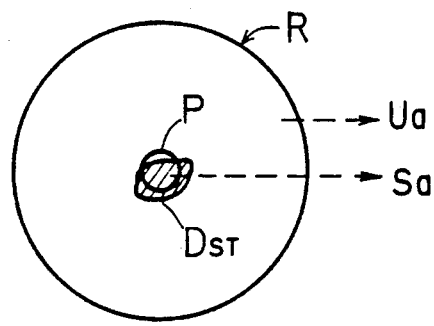
FIGS. 3A and 3B show a noted pixel to which dirt is adhered and a noted pixel which is close to a visual outline respectively.
Figure 3B:
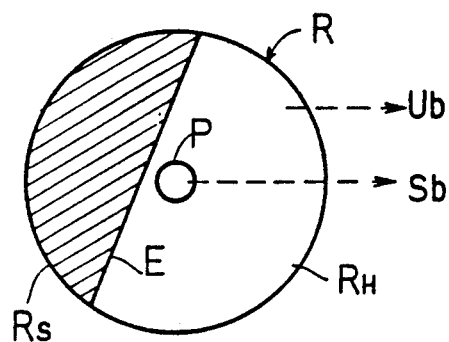
Figure 4A:
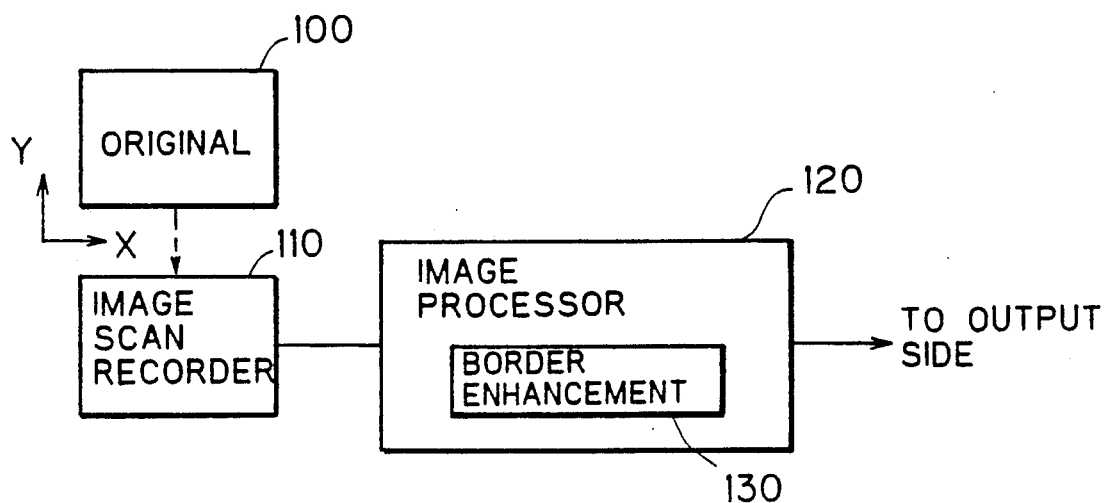
FIG. 4A is a conceptual partial block diagram showing a process scanner to which an embodiment of the present invention is applied.

FIG. 4A is a conceptual block diagram schematically showing a scan input part and an image processing part of a process scanner to which an embodiment of the present invention is applied. Referring to FIG. 4A, an image scan reader 110 of a cylindrical drum rotation system reads an image of an original 100 sequentially along scanning lines. An image signal obtained by such reading is supplied to an image processor 120 and subjected to various types of image data processing. A border enhancement circuit 130 included in the image processor 120 performs border enhancement processing on inputted data by operation as hereinafter described.

The processed image data are transferred to output side units such as a scan recorder and an image memory (not shown). Referring to FIG. 4A, symbols X and Y denote a main scanning direction and a subscanning direction on the original 100 respectively.

Throughout the specification, the term "density difference" broadly encompasses any amount expressing differences in image information such as density or luminance difference and chromaticity difference for each color component in case of color reading, and differences in monochrome density readings.

Figure 6A:
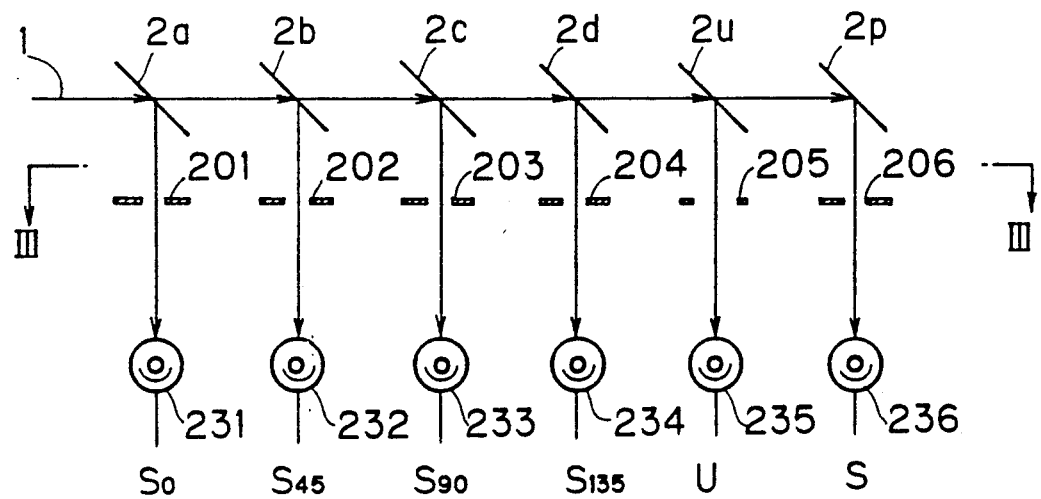
FIG. 6 illustrates an exemplary optical system employed for carrying out the present invention in an analog manner.
Figure 4B:
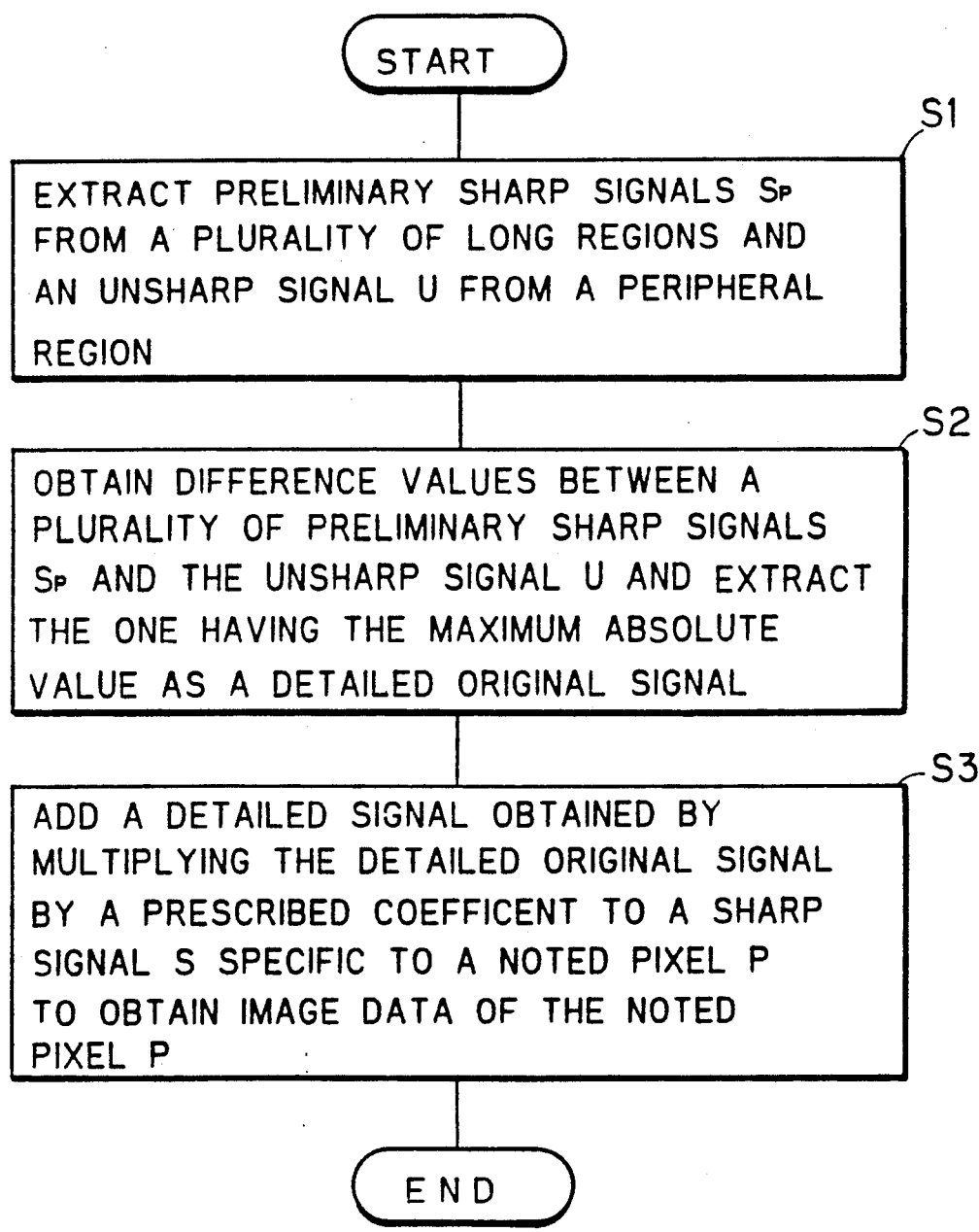
FIG. 4B is a flow chart of a border enhancement method to which the embodiment of the present invention is applied.
Figure 5:
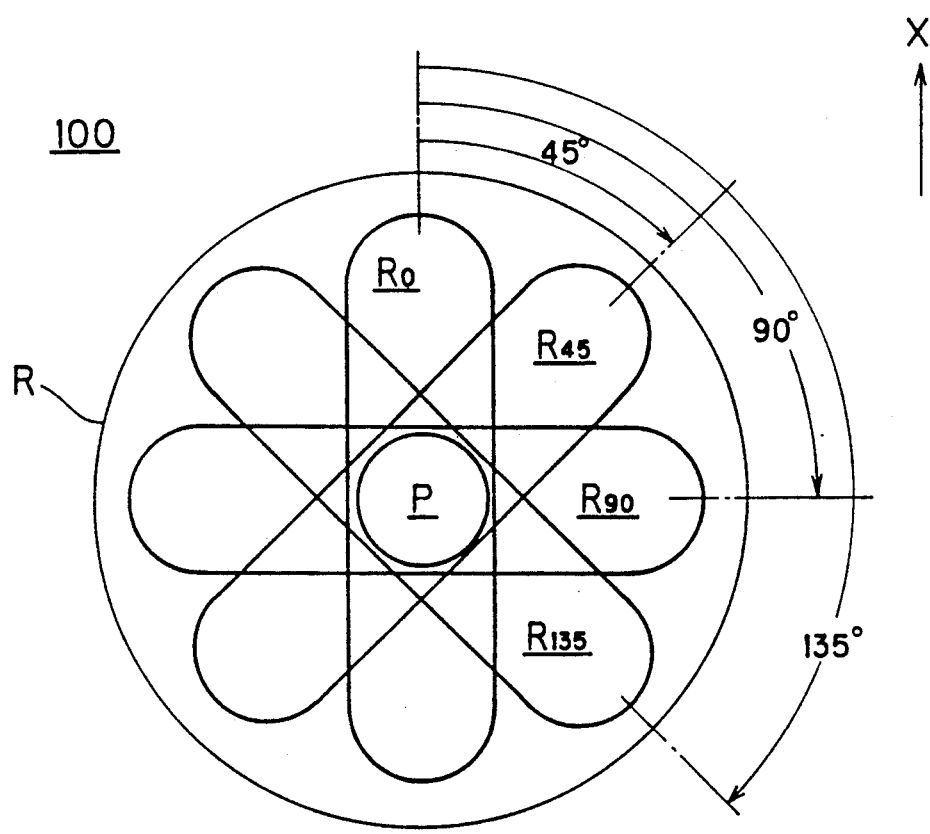
FIG. 5 illustrates relation between regions on an original from which respective signals are extracted.

FIG. 4B is a flow chart of the border enhancement method according to this embodiment. This routine is repeated for every noted pixel of the original 100. At a step S1, light components from a plurality of long regions $R_0$, $R_{45}$, $R_{90}$ and $R_{135}$ on an image 100 including a noted pixel P are independently photoelectrically converted to obtain a plurality of preliminary sharp signals $S_0$, $S_{45}$, $S_{90}$ and $S_{135}$ in addition to a sharp signal S from the noted pixel P in FIG. 5. Further, light from a region R, which is around the noted pixel P and larger than the long regions $R_0$ to $R_{135}$, is photoelectrically converted to obtain an unsharp signal U (the long regions $R_0$ to $R_{135}$ and the preliminary sharp signals $S_0$ to $S_{135}$ are hereinafter generically referred to as $R_p$ and $S_p$ respectively). The plurality of long regions $R_0$ to $R_{135}$ are elliptic areas whose major axes are at angles of 0°, 45°, 90° and 135° with respect to the main scanning direction X, for example. Image information is read from such areas in the following manner, for example. As shown in FIG. 6A light 1 from the original 100 is equally divided by beam splitters 2a to 2d and 2u and a mirror 2p. The equally divided light components are respectively detected by photomultipliers 231 to 236 through slits 201 to 206 provided with apertures $A_0$ to $A_{135}$, $A_u$ and $A_p$. As shown in FIG. 6B, which is a view taken along line III—III in FIG. 6A, these apertures $A_0$ to $A_{135}$, $A_u$ and $A_p$ have configurations and orientation angles corresponding to the regions $R_0$ to $R_{135}$ and R and the noted pixel P respectively. Photoelectrically converted signals $S_p$, U and S thus obtained serve as the preliminary sharp signals, the unsharp signal and the sharp signal respectively.

Figure 7A:
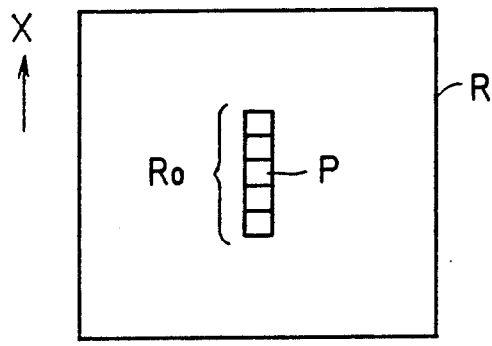
FIGS. 7A to 7F illustrate long regions in digital processing.
Figure 7B:
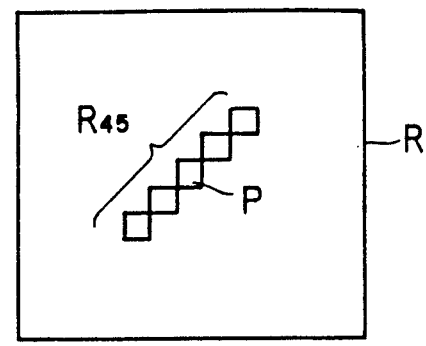
Figure 7C:
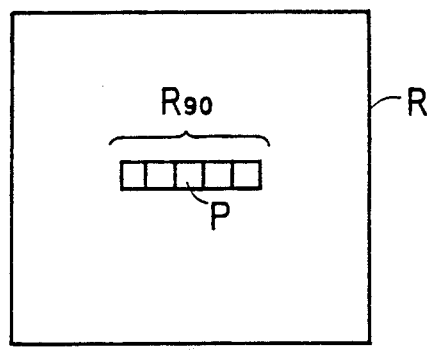
Figure 7D:
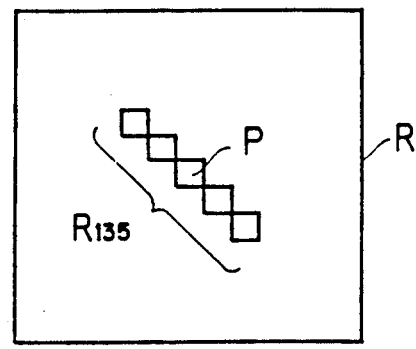
Figure 7E:
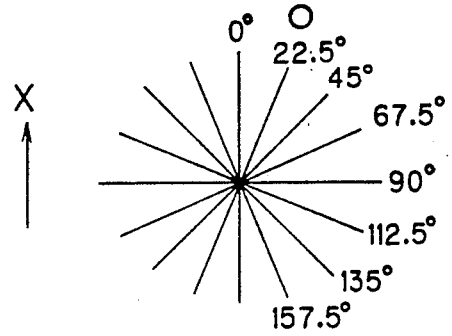
Figure 7F:
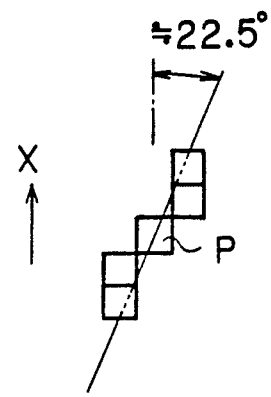

FIGS. 7A to 7D illustrate long regions set in the case of performing border enhancement after A-D converting image data for every pixel. In the case of digital processing, respective pixel data are once stored in a memory and thereafter those of addresses corresponding to long regions are sequentially read thereby to cope with setting of long regions of arbitrary configurations. FIGS. 7A to 7D show chains of five pixels formed by noted pixels P and neighbourhood pixels corresponding to long regions $R_O$ to $R_{135}$ whose major axes are at angles of 0°, 45°, 90°and 135° with respect to the scanning direction X, similarly to FIG. 5. When eight regions extending in eight directions are set as long regions as shown in FIG. 7E, for example, the long region extending in the direction shown with a circular mark in FIG. 7E is prepared by an approximate linear pixel chain as shown in FIG. 7F.

Such corresponding pixels are connected with each other in a chaining manner, while the respective pixels are desirably symmetrical with each other with respect to the noted pixel P, in order to reproduce the original. The noted pixel P may not be included but the long region may be formed by only the pixels close thereto. The unsharp signal U may be set by any one of the aforementioned conventional methods.

At a next step S2, difference values ($S_p - U$) between the plurality of preliminary sharp signals $S_p$ obtained at the step S1 and the unsharp signal U are obtained. Within the difference values, the one having the maximum absolute value is extracted as a detailed original signal.

FIGS. 8A to 8E show the status of obtaining a detailed original signal in an analog manner through apertures when black dirt $D_{ST}$ is adhered to a noted pixel P in a white area of an original 100, while FIGS. 9A to 9E show the status of a noted pixel P which is in the vicinity of a black/white borderline, i.e., a visible outline E of an image in an original 100. Description is now made on the respective cases.

Figure 8A:
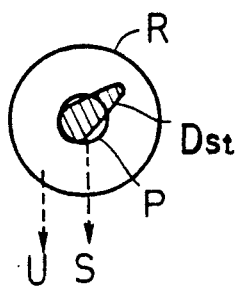
FIGS. 8A to 8E illustrate preliminary sharp signals through apertures with respect to a noted pixel to which dirt is adhered.
Figure 8B:
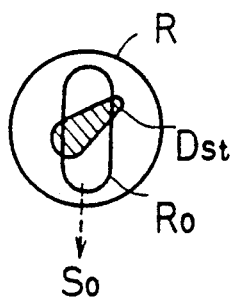
Figure 8C:
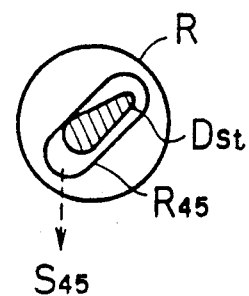
Figure 8D:
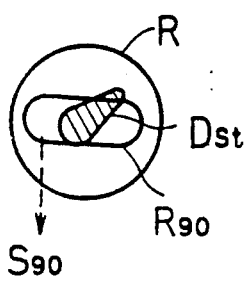
Figure 8E:
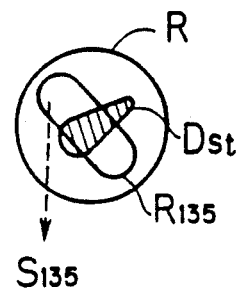

As compared with a sharp signal S shown in FIG. 8A, all of preliminary sharp signals $S_0$, $S_{45}$, $S_{90}$ and $S_{135}$ reflect density values of regions around the dirt $D_{ST}$, and density values of the dirt $D_{ST}$ and its peripheral portions are averaged with each other to form a signal indicating gray. Therefore, respective difference signals ($S_p - U$) are reduced. An area occupied by the dirt in a region $R_{45}$ is at the maximum value and a difference signal ($S_p - U$) thereof has the maximum absolute value in FIG. 8C, while this value is sufficiently small as compared with that in the conventional method of producing the detailed original signal (S − U) as a difference signal by employing the sharp signal S shown in FIG. 8A itself, whereby unnecessary enhancement by the dirt $D_{ST}$ is suppressed.

Referring to FIGS. 9A to 9E, on the other hand, values of preliminary sharp signals $S_p$ are varied with directions. In the case of a preliminary sharp signal $S_{90}$ shown in FIG. 9D, the ratio of signals from inside and outside regions $R_S$ and $R_H$ of a visual outline E is most approximate to that in the case of an unsharp signal U and the absolute value of a difference signal ($S_{90} - U$) thereof is minimized.

Figure 9A:
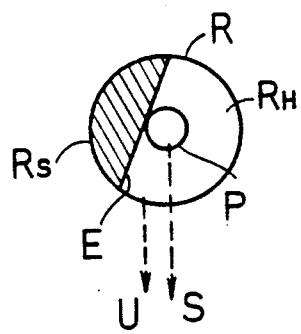
FIGS. 9A to 9E illustrate preliminary sharp signals through apertures with respect to a noted pixel close to a visual outline.
Figure 9B:
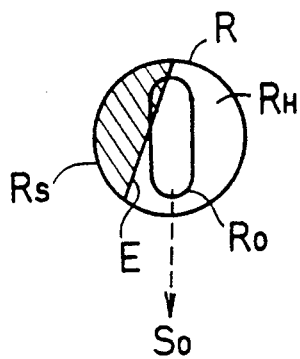
Figure 9C:
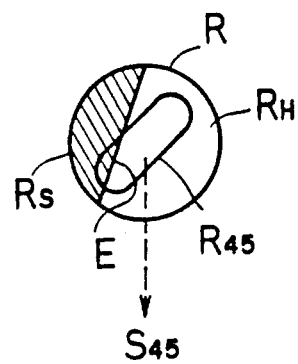
Figure 9D:
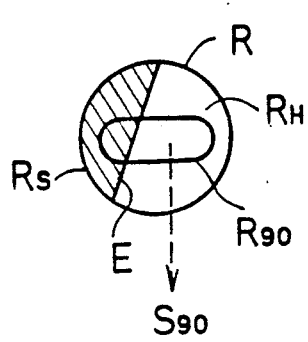
Figure 9E:
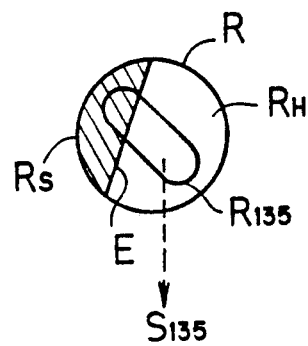

Further, a preliminary signal $S_{45}$ shown in FIG. 9C substantially reflects the density of a white region $R_H$, and its value is substantially similar to that of a sharp signal S shown in FIG. 9A. Further, its difference signal ($S_{45} - U$) has the maximum absolute value, and this difference signal ($S_{45} - U$) is selected as a detailed original signal, thereby to enable border enhancement of the visual outline E at a degree similar to that of the prior art.

At a step S3, the detailed original signal having the maximum absolute value obtained at the step S2 is multiplied by a prescribed coefficient to form a detailed signal, which is then added to the sharp signal S specific to the noted pixel P. Assuming that $S_{PM}$ represents a preliminary sharp signal producing the detailed original signal having the maximum absolute value and K (K may be equal to 1) represents the coefficient of the detailed original signal which is determined in response to the degree of border enhancement, a value newly forming pixel data $S_N$ of the noted pixel P is obtained as follows:

$$S_N = S + K(S_{PM} - U) \quad (3)$$

Border enhancement is terminated with the image data $S_N$ being regarded as the pixel data of the noted pixel P.

B. CIRCUIT STRUCTURE

Actual circuit structure for performing the aforementioned processing is now described with reference to examples. Each circuit as hereinafter described corresponds to the border enhancement circuit 130 shown in FIG. 4A.

Figure 10:
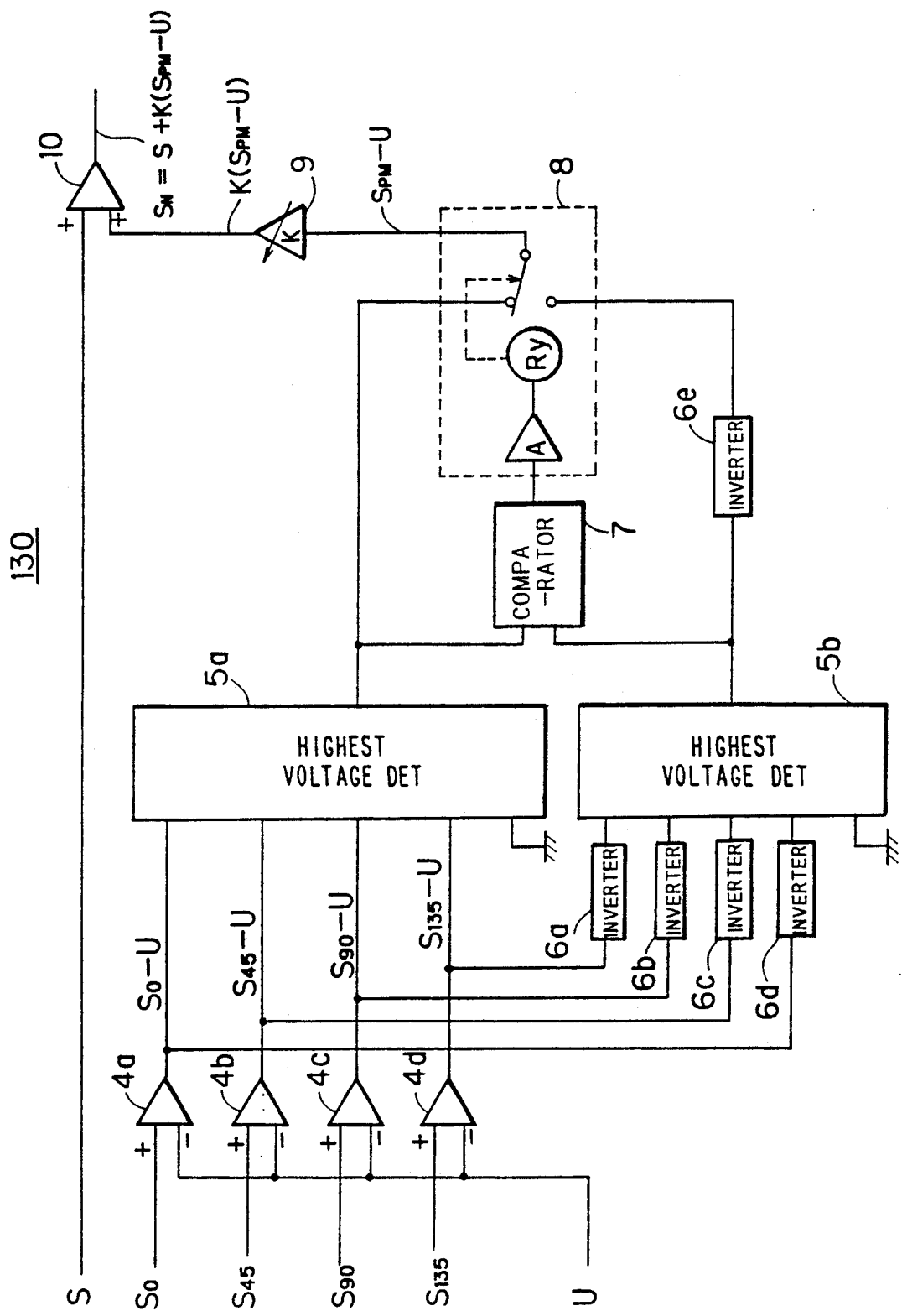
FIG. 10 shows an exemplary analog circuit outputting pixel data including an enhancement signal.

In order to perform processing in an analog manner, difference values between the preliminary sharp signals $S_0$, $S_{45}$, $S_{90}$ and $S_{135}$ prepared through the structure shown in FIG. 6A and the unsharp signal U are obtained in subtracters 4a, 4b, 4c and 4d shown in FIG. 10. Highest voltage detectors 5a and 5b detect those having the maximum absolute values of positive and negative potentials from the difference values. The outputs having negative potentials are inverted by inverters 6a to 6d. Further, the absolute values are compared with each other by a comparator 7. The output of an amplifier A provided in a switch 8 is determined by the result of such comparison so that an electronic relay Ry provided in the switch 8 is driven to select the one having a larger absolute value from the difference signals of the positive and negative potentials. The signal of the negative potential, which has been converted to a positive potential in the output of the highest voltage detctor 5b, is again inverted in the inverter 6e. A detailed original signal ($S_{PM} - U$) having the maximum absolute value is multiplied by K in a coefficient multiplier 9, and added to the sharp signal S which is specific to the noted pixel P in an adder 10. Thus, pixel data $S_N = S + K(S_{PM} - U)$ is finally generated.

Figure 11:
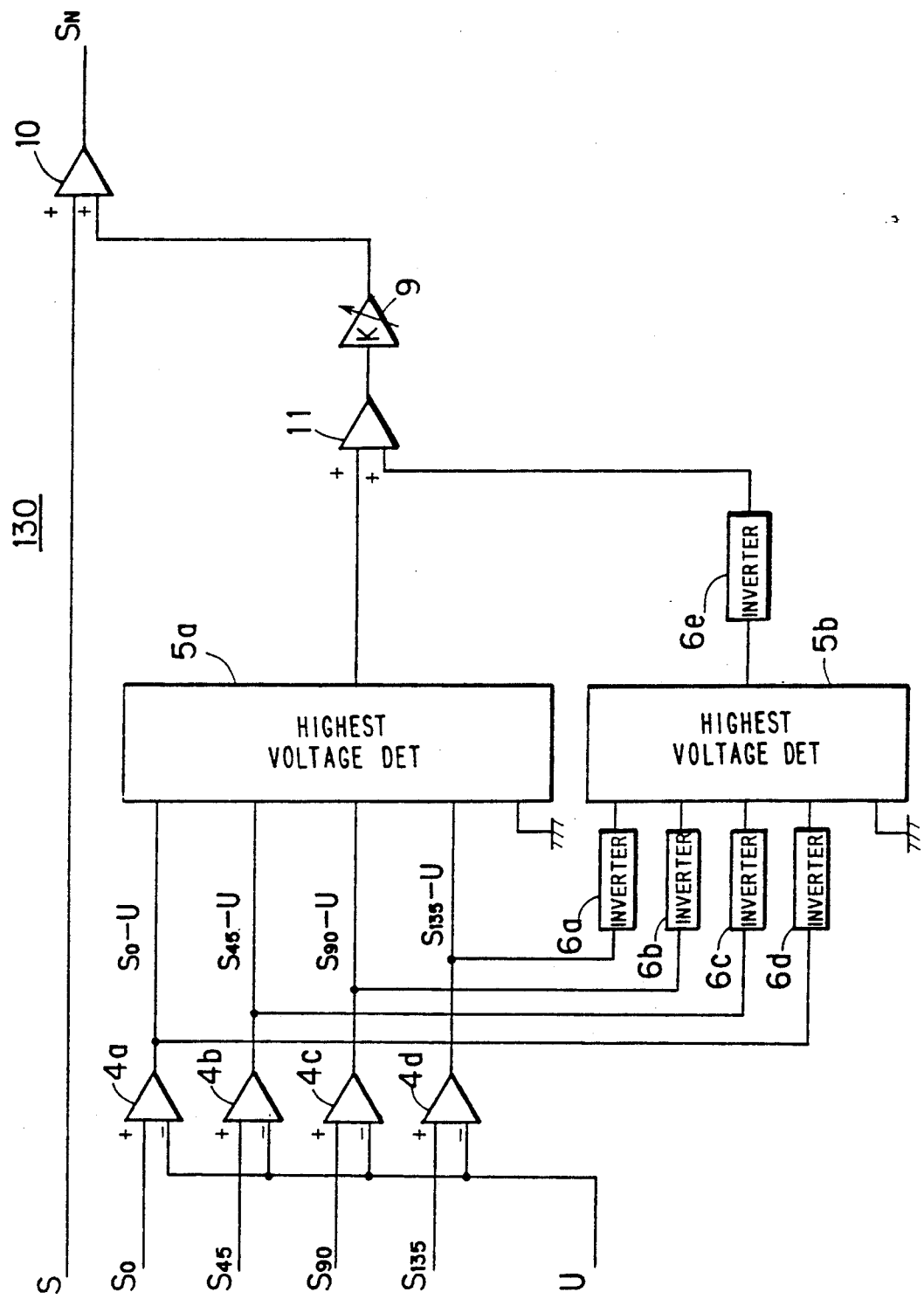
FIG. 11 shows a modification of the circuit shown in FIG. 10.

FIG. 11 shows a circuit which is obtained by simplifying the circuit shown in FIG. 10. Respective difference signals $S_0 - U$, $S_{45} - U$, $S_{90} - U$ and $S_{135} - U$ produced from a plurality of preliminary sharp signals $S_0$, $S_{45}$, $S_{90}$ and $S_{135}$ are not irrelevant to each other but may generally have the same codes since density information of the noted pixel is commonly included. If there are ones having different codes, absolute values thereof are sufficiently small. Therefore, the switch 8 shown in FIG. 10 may be replaced by an adder 11. In other words, only one of highest voltage detectors 5a and 5b is driven when all of the difference signals have the same codes, so that the one having the maximum absolute value is inputted in the adder 11. Since another input of the adder 11 is at the ground level, the output thereof forms a detailed original signal having the maximum absolute value. Even if parts of the difference signals have different codes, absolute values thereof are sufficiently small and can be substantially neglected even if the same are composed with the difference signal having the maixmum absolute value in the adder 11, and hence the output of the adder 11 may be considered as the detailed original signal having the maximum absolute value. Thereafter pixel data $S_N$ is similarly outputted through a coefficient multiplier 9 and an adder 10.

Figure 12:
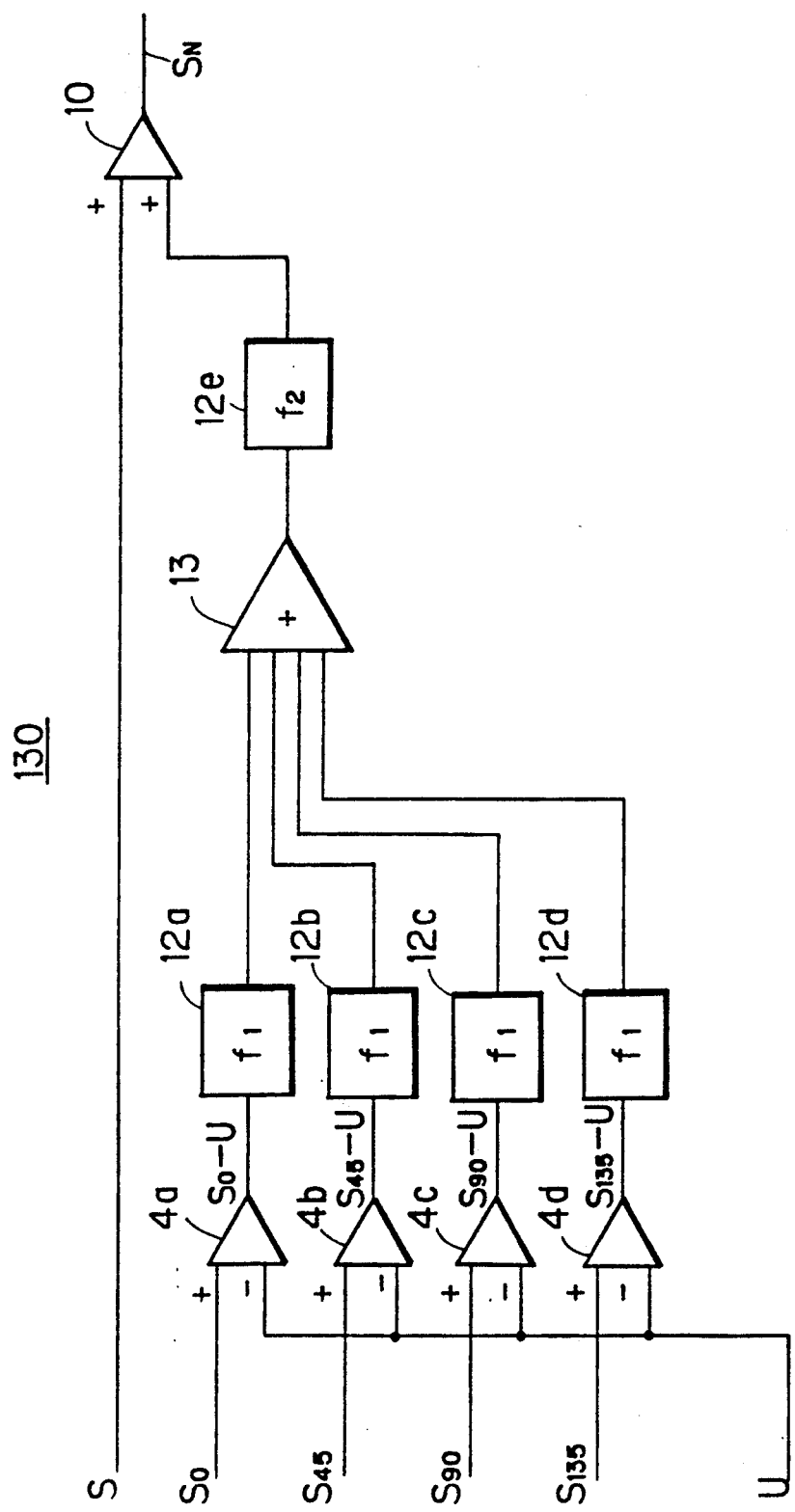
FIG. 12 shows a modification of the circuit shown in FIG. 11.
Figure 13A:
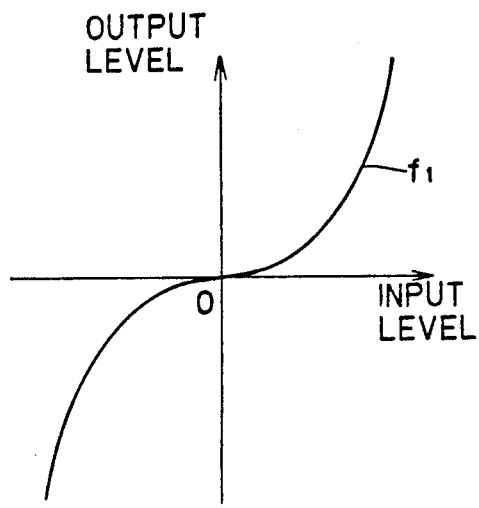
FIGS. 13A and 13B are graphs of functions employed in the circuit shown in FIG. 12.
Figure 13B:
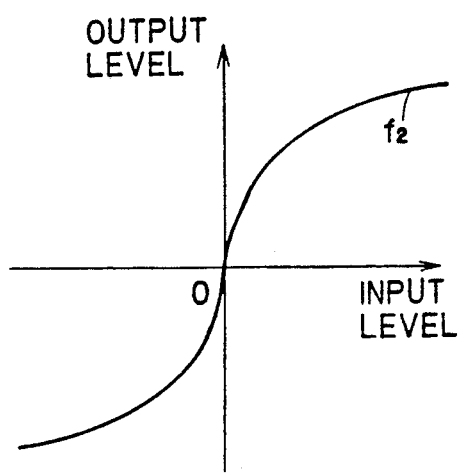

FIG. 12 shows an exemplary circuit obtained by further simplifying and modifying the circuit shown in FIG. 11. The highest voltage detectors 5a and 5b shown in FIG. 11 are replaced by transfer circuits 12a, 12b, 12c and 12d, which have a nonlinear transfer function $f_1$ whose gain is small in an interval having a small input absolute value and large in an interval having a large absolute value as shown in FIG. 13A. Signals having small absolute values are suppressed and those having large absolute values are amplified with high gains by the transfer ciruits 12a, 12b, 12c and 12d. Outputs thereof are inputted in an adder 13 to extract a signal approximately expressing that obtained by converting a detailed original signal having the maximum absolute value with the function $f_1$. In order to compensate for nonlinearity through the function $f_1$ for ensuring linearity and to perform processing of multiplication by K, a transfer circuit 12e having a transfer function $f_2$ obtained by multiplying an inverse function of the transfer function $f_1$ by K as shown in FIG. 13B is provided in a next stage of the adder 13. Thus, nonlinearity of the transfer function $f_1$ can be preferably compensated. Further, since the transfer circuits 12a to 12e can also have the function of the coefficient multiplier 9 shown in FIG. 8, the coefficient multiplier 9 can be omitted to finally obtain pixel data $S_N$ similarly to the aforementioned example.

Figure 14B:
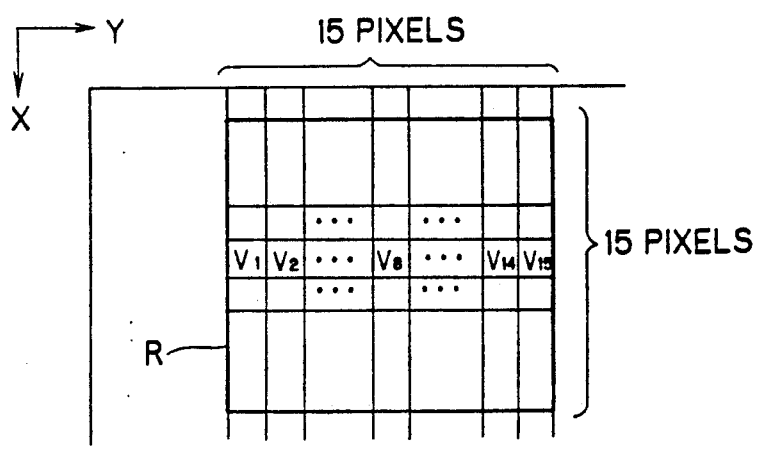
FIG. 14B illustrates relation between pixel data in the circuit shown in FIG. 14A.
Figure 14A:
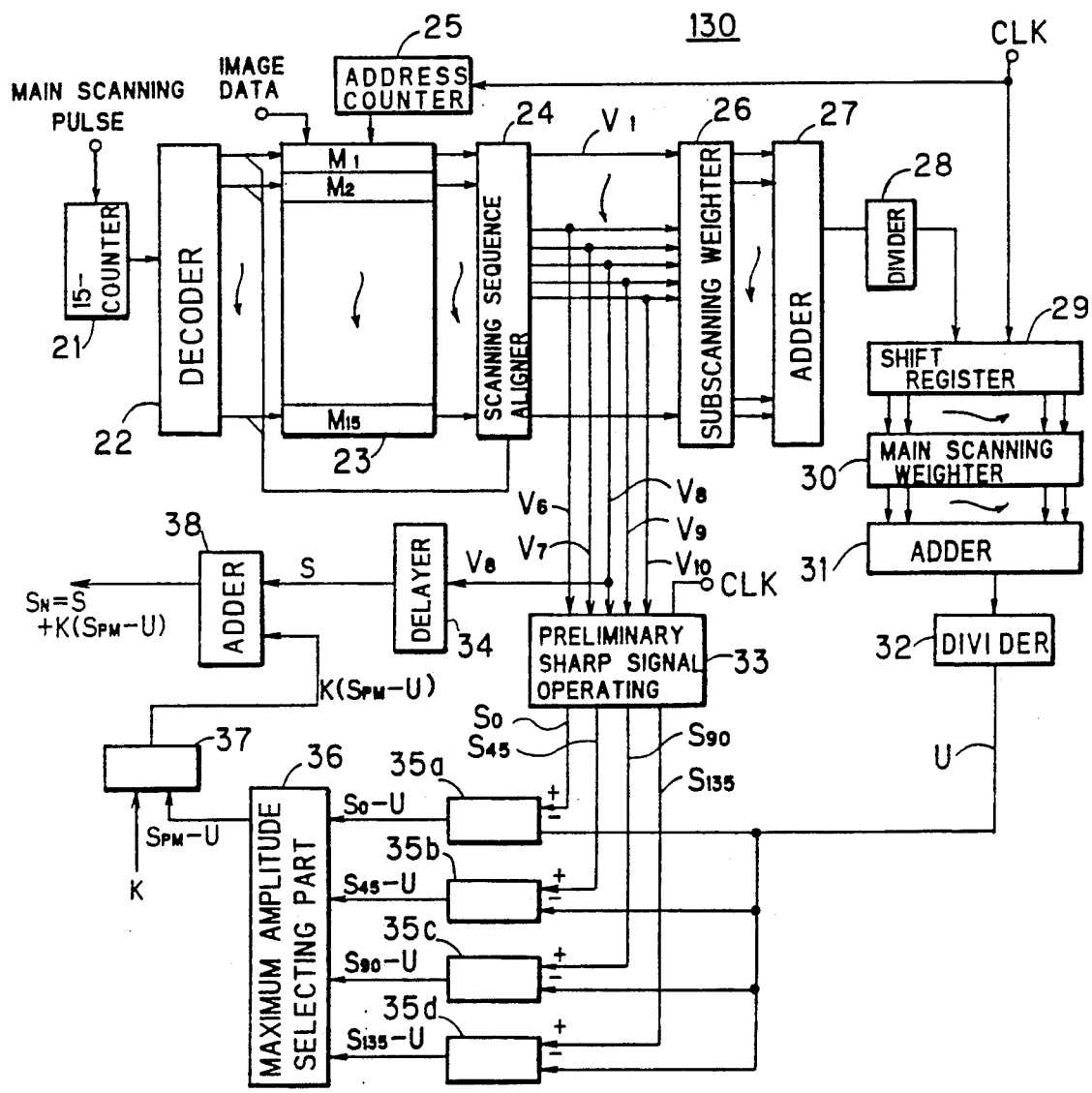
FIG. 14A illustrates an exemplary digital circuit for outputting image data including an enhancement signal.

Description is now made on a circuit for performing border enhancement processing after A-D converting pixel data with reference to an example. FIG. 14A is a block diagram showing a part of a circuit for performing digital processing corresponding to the aforementioned analog processing. A pentadecimal counter 21 generates numbers from 0 to 14. A decoder 22 decodes the numbers and generates the output designated a line in an image memory 23. The image memory stores data for 15 lines designated by an address counter 25 and give the data for the line designated by the decoder 22 to a scanning sequence aligner 24. The scanning sequence aligner 24 also recieves the output of the decoder 22 to relocate the data in the sequence of scanning and generates the data V1~V15 for pixels in each line of a 15×15 matrix.

The data V1~V15 are weighted by a predetermined rule in a subscanning weighter 26 and the weighted results are added each other in an adder 27. The added result is given to a divider 28 and is divided by a coefficient. The divided result is given to a shift resister 29. The shift resister 29 stores the results for the 15 lines, for example, and give the results to a main scanning weighter 30. The results are weighted by a predetermined rule in the main scanning weighter 30 and the weighted results are added to each other in an adder 31. The added result is divided by a coefficient related to the predetermined rules in a divider 32 and an unsharp signal U is generated finally.

While the outputs $V_6$ to $V_{10}$ are inputted in a preliminary sharp signal operating part 33, whereby respective preliminary sharp signals $S_0$, $S_{45}$, $S_{90}$ and $S_{135}$ are outputted. The output $V_8$ corresponding to a sharp signal S of a noted pixel P is also inputted in a delayer 34, and outputted in a delay by a time corresponding to operation as hereinafter described. The respective preliminary sharp signals $S_0$, $S_{45}$, $S_{90}$ and $S_{135}$ and the unsharp signal U are inputted in substracters 35a to 35d, thereby to form difference signals $S_0-U$, $S_{45}-U$, $S_{90}-U$ and $S_{135}-U$. A maximum amplitude selecting part 36 selects the one having the maximum absolute value as a detailed original signal $(S_{PM}-U)$, which is then multiplied by an externally given coefficient K in a coefficient multiplier 37. The coefficient multiplier 37 generates detailed signal $K(S_{PM}-U)$, which is added up with the aforementioned sharp signal S in an adder 38, to provide pixel data $S_N=S+K(S_{PM}-U)$.

Figure 15:
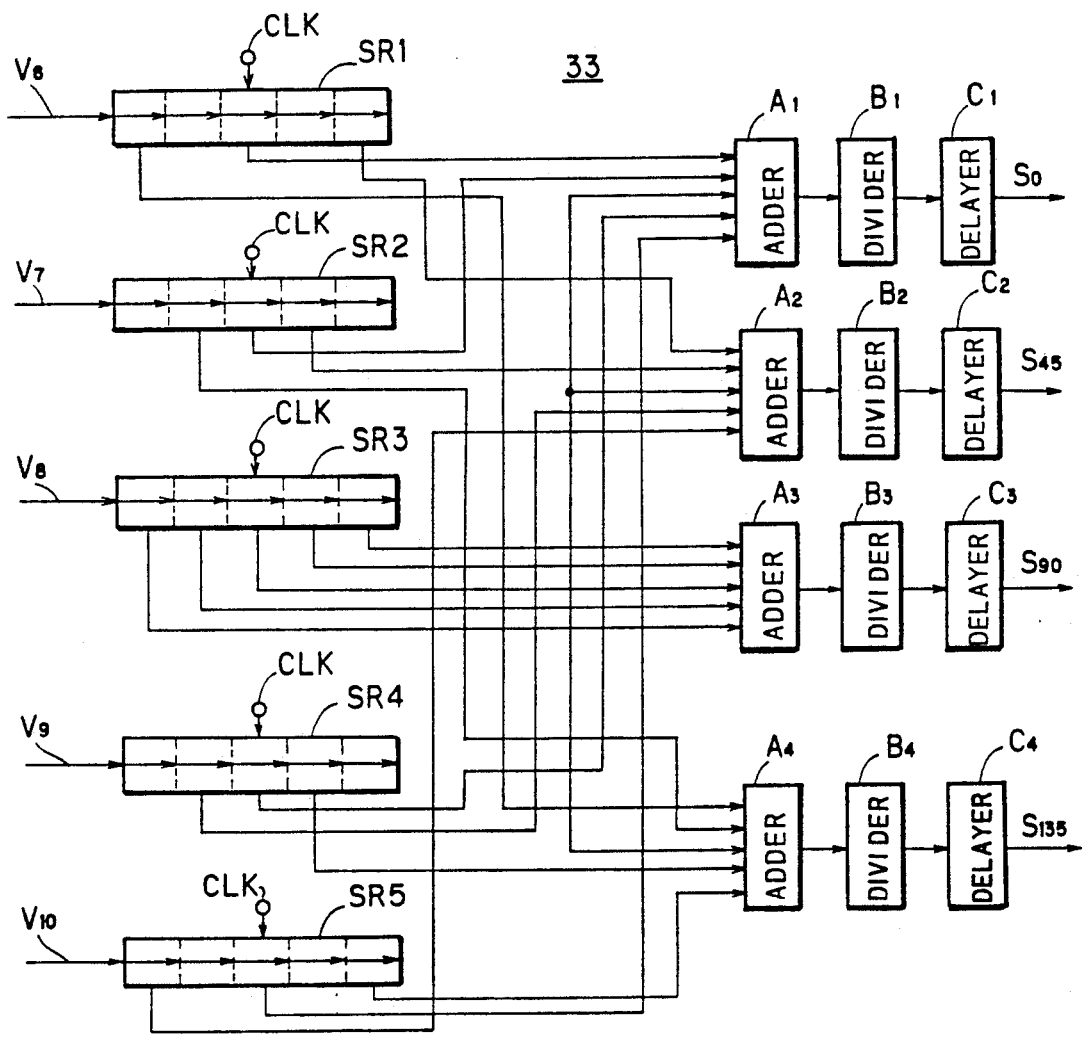
FIG. 15 illustrates a part of the circuit shown in FIG. 14A.

FIG. 15 shows the structure of the preliminary sharp signal operating part 33. Pixel data from the inputs $V_6$ to $V_{10}$ are inputted in shift registers SR1 to SR5 to form five stages, which are driven in synchronization with the pixel clock CLK. The shift registers SR1 to SR5 hold pixel data of pixels arranged in the form of a 5×5 matrix around the noted pixel P. Corresponding five pixel data are extracted therefrom and inputted in adders A1 to A4 and dividers B1 to B4, to be averaged. Respective preliminary sharp signals $S_0$, $S_{45}$, $S_{90}$ and $S_{135}$ obtained by such operation are outputted in prescribed delays through delayers C1 to C4.

Processing equivalent to that in the aforementioned analog circuit can be performed through the aforementioned digital circuit. In the aforementioned digital processing, it is an advantage that an image memory can be commonly applied to the processing of generating the unsharp signal U and processing of generating the plurality of preliminary sharp signals $S_p$.

An effect of border enhancement is closely related to resolution of human eyes watching a printed matter from a distance of distinct vision. Since a color scanner or the like has a wide magnification set range of 20% to 2000%, for example, the range of border enhancement is preferably determined in response to the magnification value. Therefore, the aforementioned steps are preferably conveniently performed in an image data output side, not in an input side. In the case of a color scanner, it is preferable to apply the present invention not to R, G and B signals obtained by scanning an original but to Y, M, C and K signals of finished size already subjected to color tone correction and defined in magnification. In order to simplify the apparatus, border enhancement with respect to respective output signals of Y, M, C and K is preferably performed with the representative of the M signal, which is most related to shading recognition of human eyes.

The present invention is not restricted to the color scanner but is also applicable to a facsimile or the like. Further, the read part thereof is not restricted to the combination of a cylindrical drum and photomultipliers but may also be prepared from combination of a plane type scanner, an image pickup tube of a TV camera, a CCD array and the like.

As described above, according to the present invention, a plurality of preliminary sharp signals are extracted from a plurality of long regions whose major axes are oriented in different directions respectively. Therefore, as to a continuous border part, the absolute value of difference between a preliminary sharp signal obtained from a long region extending along the direction of such continuation and an unsharp signal is particularly large as compared with those of difference values between other preliminary signals and the unsharp signal, and since a spot defect has no strong directivity and occupies only a part of each long region, a plurality of preliminary sharp signals obtained from long regions of respective directions are substantially at the same degrees, and absolute values of difference values between the same and the unsharp signal are reduced.

Within a plurality of preliminary signals, therefore, the one having the maximum absolute value of difference between the same and the unsharp signal is employed in order to generate a detailed original signal (hence pixel data of a noted pixel), so that the degree of enhancement can be suppressed as to a spot defect while maintaining the function of enhancing density difference as to a continuous border part.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. A method of enhancing a border of an image region included in an original image, comprising the steps of:

(a) obtaining an object pixel data representing a density level of a designated object pixel on said original image, (b) obtaining a plurality of first image data representing respective density levels of a plurality of directional areas which are located at a neighborhood of said object pixel and are oriented in different directions on said original image, respectively, (c) obtaining a second image data representing a density level of a closed area which includes said plurality of directional areas and whose center is located at said object pixel, (d) obtaining absolute value of respective differences between said plurality of first image data and said second image data, (e) finding a maximum one of said absolute values, (f) combining said maximum one with said object pixel data to obtain a combined data, and (g) repeating the steps (a) through (f) while updating said designated object pixel to thereby obtain an image data as a set of respective combined data representing an image in which said border is enhanced in density levels.

2. A method of claim 1 wherein
the step (b) includes the step of:
(b-1) photoelectrically reading said original image through a plurality of directional apertures to obtain said plurality of first image data, respectively, where respective shapes and directions of said plurality of directional apparatus are adapted for said plurality of said directional areas.

3. A method of claim 2, wherein
respective centers of said plurality of said directional areas are located at said designated object pixel.

4. A method of claim 3 wherein
respective oriented directions of said plurality of directional areas are in a rotational symmetry around said designated object pixel.

5. A method of claim 1 further comprising the steps of:
(h) photoelectrically reading said original image for each pixel to obtain analog image signals representing density levels of said original image for each pixel, and
(i) converting said analog image signals into digital image signals, the steps (a) through (c) being conducted on the basis of said digital image signals.

6. A method of claim 5 wherein
the step (a) includes the step of;
(a-1) from said digital image signals, extracting a first digital image signal representing a density level of said designated object pixel to obtain said object pixel data,
the step (b) includes the steps of:
(b-1) from said digital image signals, extracting plural sets of second digital image signals representing respective density levels of pixels belonging to said plurality of directional areas, respectively, and
(b-2) summing up each data in said set of second digital image signals to obtain each of said plurality of first image data, and
the step (c) includes the steps of.
(c-1) from said digital image signals, extracting a plurality of third digital image signals representing respective density levels of pixels belonging to said closed area, and
(c-2) summing up said plurality of third digital image signals to obtain said second image data.

7. A method of claim 6 wherein
said closed area corresponds to a pixel matrix having a predetermined size, and
said plurality of directional areas correspond to a plurality of pixel chains, respectively.

8. A method of claim 7 wherein
each of said plurality of pixel chains is a straight chain.

9. A method of claim 7 wherein
said plurality of pixel chains include a bent chain.

10. An image reader for reading an original image and enhancing a border of a region included in said original image, comprising:
(a) splitter means for splitting a light from said original image into first through N-th lights, where N is an integer larger than three,
(b) a first member which is placed in a light path of said first light and has a first aperture,
(c) second through (N−1)-th members which are placed in respective light paths of said second through (N−1)-th lights and have second through (N−1)-th apertures, respectively, in which said second through (N−1)-th apertures are directional apertures oriented to different directions,
(d) an N-th member which is place in a light path of said N-th light and has an N-th aperture whose size is larger than said first through (N−1)-th apertures,
(e) N photoelectric converter placed at positions to which said first through N-th lights having passed through said first through N-th apertures are propagated, to convert said first through N-th lights into first through N-th electric signals,
(f) means for substracting said N-th electric signals from said second through (N−1)-th electric signals individually to obtain at least two difference signals,
(g) means for obtaining an enhancement signal which is substantailly proportional to maximum one of respective absolute values of said at least two difference signals,
(h) means for combining said enhancement signal with said first electric signal to obtain a combined signal, and
(i) means for relatively moving said original image and a combination of said means (a) through (e) to obtain a set of combined signals representing respective density levels of pixels of an image in which said border is enhanced in density levels.

11. An image reader of claim 10 wherein
said means (g) includes:
(g-1) means for reversing respective signs of said at least two difference signals to obtain at least two sign-reversed difference signals, and
(g-2) means for comparing said at least two difference signals and said at least two sign-reversed difference signals with each other to extract a maximum signal therefrom, said maximum signal serving as said maximum one.

12. An image reader of claim 10 wherein
said means (g) includes:
(g-1) means for reversing respective signs of said at least two difference signals to obtain at least two sign-reversed difference signals,
(g-2) means for extracting a first maximum signal from said at least two sign-reversed difference signals, (g-3) means for extracting a second maximum signal from said at least two sign-reversed difference signals, (g-4) means for reversing a sign of said second maximum signal to obtain a sign-reversed second maximum signal, (g-5) means for adding said sign-reversed second maximum signal to said first maximum signal to obtain an added maximum signal, and (g-6) means for generating said enhancement signal proportional to said added maximum signal.

13. An image reader of claim 10 wherein said means (g) includes:

(g-1) means for converting said at least two difference signals through a predetermined non-linear conversion function to obtain at least two first converted signals, (g-2) means for summing up said at least two first converted signals to obtain a summed signal, and (g-3) means for converting said summed signal through a reverse function of said non-linear function to obtain said enhancement signal.

14. An apparatus for converting a first digital image data representing a first image for each pixel into a second digital image data representing a second image for each pixel, a border of a region included in said second image being enhanced in density levels as compared with said first image, said apparatus comprising:

(a) means for extracting a set of pixel data from said first digital image data, said set of pixel data representing respective density levels of pixels which belong to a pixel matrix defined on said first image, (b) means for extracting a first component from said set of pixel data, said first component representing a density level of a central pixel of said pixel matrix, (c) means for extracting plural sets of second components from said set of pixel data, wherein said plural sets of second components represent respective density levels of pixels which belong to a plurality of pixel chains in said pixel matrix, respectively, and said plurality of pixel chains extend in different directions and are intercrossed at said central pixel, (d) means for summing up respective components in each of said plurality of second components to obtain a plurality of first sums, (e) means for extracting third components from said first digital image data, said third components representing density levels of all pixels in said pixel matrix, (f) means for summing up said third components to obtain a second sum, (g) means for subtracting said second sum from said plurality of first sums individually to obtain a plurality of difference values, (h) means for selecting a maximum one from respective absolute values of said plurality of said difference values, (i) means for combining said maximum one with said first component to obtain a combined value, and (j) means for repeatedly enabling said means (a) through (i) while repeatedly updating said pixel matrix so that substantially all of pixels of said first image are serially employed as said central pixel, whereby said second digital image data is obtained as a set of combined values each of which is obtained by said means (i).

15. An apparatus of claim 14 wherein said plurality of pixel chains are in rotational symmetry around said center pixel.

16. An apparatus of claim 15 wherein each of said plurality of pixel chains is a straight chain.

17. An apparatus of claim 15 wherein said plurality of pixel chains have a bent chain.

18. A method of enhancing a border of an image region included in an original image, comprising the steps of:

(a) obtaining object pixel data representing a density level of a designated object pixel on said original image, (b) obtaining a plurality of first image data representing respective density levels of a plurality of elongated areas each of which includes said object pixel, wherein said elongated areas are oriented in different directions on said original image, respectively, (c) obtaining second image data representing a density level of a closed area which includes said plurality of elongated areas and whose center is located at said object pixel, (d) obtaining absolute values of respective differences between said plurality of first image data and said second image data, (e) finding a maximum one of said absolute values, (f) combining said maximum one with said object pixel data to obtain combined data, and (g) repeating the steps (a) through (f) while updating said designated object pixel to obtain image data as a set of respective combined data representing an image in which said border is enhanced in density levels.

* * * * *